Dec. 5, 1950    D. L. CHRISTENSON    2,532,834
OSCILLATION GENERATOR CIRCUIT
Filed Sept. 6, 1945
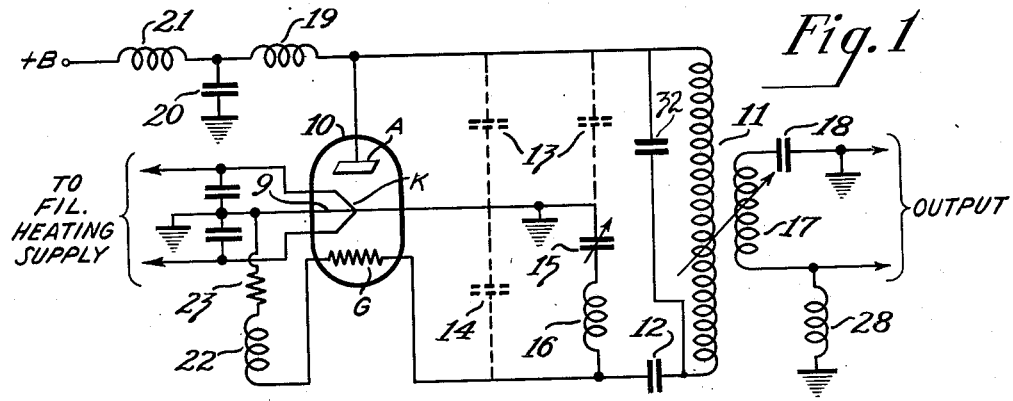
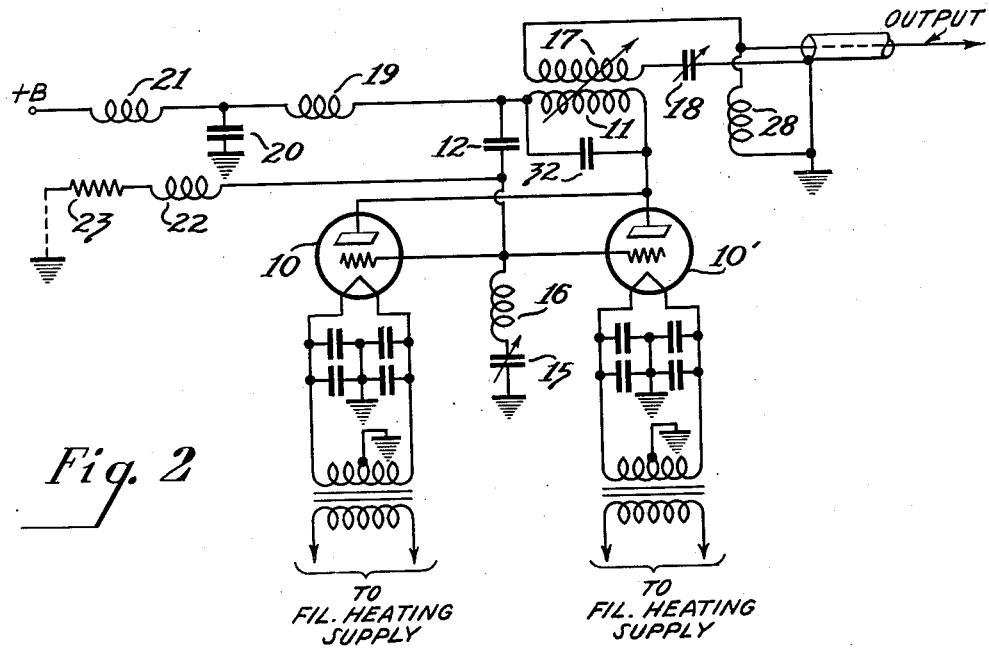
INVENTOR
Donald L. Christenson
BY H. G. Grover
ATTORNEY Patented Dec. 5, 1950

2,532,834

UNITED STATES PATENT OFFICE 2,532,834

OSCILLATION GENERATOR CIRCUIT

Donald L. Christenson, Haddon Heights, N. J., assignor to Radio Corporation of America, a corporation of Delaware Application September 6, 1945, Serial No. 614,738

8 Claims. (Cl. 250—36)

This invention relates to electron discharge device oscillation generator circuits, and particularly to a high frequency oscillator circuit suitable for use as a power generator for industrial heating purposes.

It is known to employ a Colpitts type of oscillation generator for producing high frequency oscillations. The conventional Colpitts oscillator includes a vacuum tube whose electrodes are coupled to an oscillatory circuit having an inductance coil shunted by a pair of series connected capacitors. The anode of the vacuum tube is customarily connected to one terminal of the inductance coil, the grid to the other terminal of the inductance coil, and the cathode to the junction point of the pair of series connected capacitors. The degree of excitation on the grid of the tube depends upon the ratio of the impedances between grid-to-cathode and anode-to-cathode electrodes, which, in turn, is a direct function of the capacity ratio between grid-to-cathode and anode-to-cathode electrodes, assuming the frequency to be constant. It will thus be evident that a variation of the grid-to-cathode and anode-to-cathode capacitors will vary the excitation on the grid of the vacuum tube oscillator. Heretofore this variation of the grid excitation has been achieved by making the capacitors variable. The difficulty with this method of varying the grid excitation is that it requires unduly large capacitor plates for high power generators.

The present invention provides, among other things, a more simplified, inexpensive and compact manner of varying the grid excitation of a Colpitts oscillator than heretofore.

Briefly stated, the present invention provides a modified type of Colpitts oscillator having a grounded cathode and which makes use of the stray capacities-to-ground and the interelectrode or internal capacities between anode and cathode and grid and cathode. In order to enable a variation in the ratio of these capacities and hence, a variation of the grid excitation, there is supplied an additional variable capacitor between the grid and ground (or cathode). Because of the large voltage values employed in the electronic power generator of the invention, the plates of this additional capacitor have relatively large surface areas and large spacing therebetween. To avoid the use of unduly large capacitor plates in the interest of compactness, and still obtain the same effect as a larger capacitor, the present invention provides an inductance coil in series with the additional capacitor, and this coil partially series tunes the added capacitor at the operating frequency, or in other words, the value of the inductor in combination with the additional capacitor has a resonant frequency above the operating frequency of the oscillator. The result is a lower capacity reactance, or effectively a higher value of capacity from grid to ground, hence enabling a lower but still variable and controllable excitation voltage on the grid.

An explanation of some of the principles involved in the present invention will now be given: Ordinarily, a large capacitor provides a low impedance path for alternating current passing therethrough, while a small capacitor provides a high impedance path for the same alternating current. By inserting an inductance coil in this path in series with a small capacitor, and partially tuning the series circuit of coil and capacitor to the operating frequency in order to provide a desired impedance there is obtained the same low impedance effect as is obtained by using a larger capacitor without the coil. The use of a small capacitor enables the use of more compact equipment, which is a highly desirable feature in high power apparatus. Since coils are relatively inexpensive compared to the cost of furnishing large capacitors in cabinets specially designed to accommodate them, it will be seen that the use of a coil in series with a small capacitor provides an inexpensive way of enabling the variation and control of the excitation voltage on the grid.

The following is a description of the invention in conjunction with a drawing, wherein Fig. 1 illustrates, schematically, a modified Colpitts electronic power generator circuit embodying the principles of the invention, and Fig. 2 illustrates a Colpitts oscillator circuit similar to Fig. 1 employing two vacuum tubes in electrically parallel relation.

The power generator of Fig. 1 comprises a vacuum tube 10 having a cathode K, an anode A and a grid G. The tube 10, in practice, is used for generating high frequencies for heating purposes and is water cooled by means of a water jacket surrounding the elongated anode. Such a tube, by way of example, might be an RCA type 9C21. Tube 10 is connected in a modified Colpitts oscillator circuit, and may generate oscillations, by way of example, of approximately 13 to 16 megacycles.

The cathode K is directly connected to ground by means of the center tap connection 9, as shown. The grid G is connected to the cathode through a radio frequency choke coil 22 and a grid bias resistor 23.

The tank or oscillatory circuit includes the inductance coil 11 which is connected at opposite ends to the anode A and to the grid G through a blocking condenser 12. It is preferred that coil 11 be tubular and the water cooling fluid circulated therethrough. The capacity from the anode to the cathode or ground, represented by the dotted capacitors 13, consists of the stray capacity from the tube water jackets and mountings to ground, plus the internal (inter-electrode) anode-to-cathode capacity. It should be noted that no anode-to-ground capacity is introduced beyond the inherent anode-to-ground capacity of the tube and the stray capacity. The capacity from grid G to the cathode or ground consists of the internal (inter-electrode) grid-to-cathode capacity represented by the dotted capacitor 14, plus an additional variable air capacitor 15. An additional air capacitor 32 is connected directly across coil 11 to provide adjustment of frequency.

Variation of the grid excitation voltage can be achieved by varying the capacitor 15. In some cases it has been found that the available circuit components produce too low a value of capacity from grid to ground and hence too high an excitation voltage on the grid G of the tube 10. In order to overcome this difficulty and obtain a lower but still variable and controllable excitation voltage on the grid without using a larger capacitor for 15, there is provided a coil 16 placed in series with the capacitor 15. This coil 16 serves to partially series tune capacitor 15, resulting in a lower capacity reactance or effectively a higher value of capacity from grid to ground.

The advantage of using coil 16 is as follows: It enables the use of a small capacitor and avoids the necessity of using a larger capacitor. Since the plates of air capacitor 15 must have large surface areas due to the high voltages employed in these power generators, the use of a small capacitor conserves space which is a highly desirable feature. And further, the coil 16 is a simple and inexpensive expedient compared to designing a larger capacitor and a larger housing unit for the apparatus.

Output from the oscillator is taken by way of coil 17 which is inductively coupled to coil 11 of the tank circuit. Control of the output voltage is obtained by varying the coupling between coils 11 and 17 by varying the spacing of coil 17 relative to coil 11, and also capacitor 18, both of which are preferably motor driven and can be controlled from the front panel. Inductor coil 28 is a drain coil which provides a direct current path to ground in order to drain off static charges which might otherwise remain when the equipment is shut down. It also prevents undesired flash-overs from putting high direct current voltages into the output circuit and endangering the output circuit and the operator.

Anode voltage of positive polarity relative to the cathode is supplied from source +B (rectifier, not shown) through a radio frequency choke coil 19. Condenser 20 is a radio frequency by-pass capacitor for the normal operating frequency and prevents oscillations of the operating frequency from entering source +B.

In using the oscillator circuit of Fig. 1 to produce oscillations of 13 to 16 megacycles, it was found that when the oscillator was operated at one-half the rated anode voltage or less, that the oscillations would be interrupted or self-modulated at about 20 to 50 kc. It is believed that this behavior on the part of the oscillator is due to a blocking effect caused by the building up of a charge on the grid-to-ground capacitor which momentarily maintains the grid bias constant regardless of a decreasing output, thus providing an excessive bias on the grid for a decreasing output. This momentary excessive bias causes the oscillations of operating frequency (13 to 16 mc.) to further decrease in intensity, and this process continues until normal oscillations cease completely; that is, until the operation of the oscillator is stopped. Normal operation of the oscillator is resumed when the charge on the grid-to-ground capacitor has leaked off to a point which enables the oscillator to become self-starting.

Such intermittent operation or blocking of the oscillator is highly undesirable, and is prevented in accordance with one feature of the invention by means of a relatively low frequency inductance coil 21 placed in series in the anode voltage supply connection. Coil 21 has a relatively high impedance at the undesired interrupting frequency or, stated in other words, this coil has a large reactance to current of the frequency at which the oscillator circuit tends to block. The reactance of this coil tends to damp out the changes in plate current necessary to produce oscillations of this frequency and thus prevents the oscillations of the interrupting frequency from starting.

Fig. 2 shows a modified Colpitts power generator circuit which is substantially identical in operation to that of Fig. 1, except that Fig. 2 utilizes two tubes 10 and 10' in parallel. The equivalent electrical circuit is the same as Fig. 1. The same parts in both figures have been given the same reference numerals.

In one embodiment of Fig. 2 tried out in practice for dielectric heating purposes, the tubes 10 and 10' were RCA type 9C21 water cooled tubes and the circuit components were selected to give an operating frequency of approximately 13 to 16 megacycles with a power output of 100 kilowatts. The capacitor 15 consisted of two air spaced plates each about 16 inches wide by 36 inches long, furnishing a variable capacity of the order of 125 mmf. Condenser 12 had a value of 550 mmf. Condenser 20 had a value of 500 mmf. Tank coil 11 was tubular and cooled by water circulating therein. The voltage supplied to the tube anodes was of the order of 14 kilovolts.

The term "ground" used in the specification and appended claims is deemed to include any point or surface of zero potential for D. C. or alternating current.

What is claimed is:

1. A high frequency power generator useful for industrial heating purposes comprising a vacuum tube operating in a Colpitts oscillator circuit, said vacuum tube having a grid, an anode and a cathode, an inductance coil coupled to said grid and anode, the capacity between said anode and cathode consisting substantially only of the interelectrode anode-to-cathode capacity and the stray capacities of the associated circuit elements, the capacity between said grid and cathode consisting of the interelectrode grid-to-cathode capacity and also a variable capacitor located externally of the vacuum tube connected between said grid and cathode, and an inductor in series with said last capacitor in the path between said grid and cathode, said inductor having such value that the combination of inductor and variable capacitor has a resonant frequency above the operating frequency of the generator, whereby there results a lower capacity reactance or effectively a higher value of capacity from grid to cathode.

2. A high frequency oscillation generator comprising a vacuum tube having a grid, an anode and a cathode, a connection from ground to said cathode, an oscillatory circuit including an inductance coil coupled between said grid and anode, the capacity between said anode and cathode consisting substantially only of the internal anode-to-cathode tube capacity and the stray capacities to ground of the associated circuit elements, the capacity between said grid and cathode consisting of the internal grid-to-cathode tube capacity plus the capacity of a variable condenser located externally of the vacuum tube and connected between said grid and ground, and an inductor in series with said condenser in the path between said grid and ground, said inductor having such value that the combination of inductor and variable condenser has a resonant frequency above the operating frequency of the generator, whereby there results a lower capacity reactance or effectively a higher value of capacity from grid to ground.

3. A high frequency heating system comprising a power generator producing a power output of a plurality of kilowatts and at a frequency of the order of 13 to 16 megacycles, said generator including a water-cooled vacuum tube including an anode, a cathode and a grid, a connection from ground to said cathode, an oscillatory circuit including a tubular inductance coil through which circulating cooling water flows coupled between said grid and anode, the capacity between said anode and cathode consisting substantially only of the internal anode-to-cathode tube capacity and the stray capacities to ground of the associated circuit elements, the capacity between said grid and cathode consisting of the internal grid-to-cathode tube capacity plus the capacity of a variable air condenser located externally of the vacuum tube and connected between said grid and ground, said variable condenser comprising two metallic plates each having dimensions of the order of 16 inches wide by 36 inches long, and an inductor in series with said condenser in the path between said grid and ground, said inductor having such value that the combination of inductor and variable condenser has a resonant frequency above the operating frequency of the generator, whereby there results a lower capacity reactance or effectively a higher value of capacity from grid to ground.

4. A high frequency heating system comprising a power generator having two water-cooled vacuum tubes connected in electrically parallel relation, each of said tubes having grid, anode and cathode electrodes, a connection from ground to said cathodes, an oscillatory circuit including a tubular inductance coil through which circulating cooling water flows coupled between said grids and anodes, the capacity between said anodes and cathodes consisting substantially only of the internal anode-to-cathode tube capacities and the stray capacities to ground of the associated elements, the capacity between said grids and cathodes consisting of the internal grid-to-cathode tube capacities plus the capacity of a variable air condenser located externally of the vacuum tubes and connected between said grids and ground, said variable air condenser comprising air spaced metallic plates each of the order of 16 inches wide by 36 inches long, and an inductor in series with said condenser in the path between said grids and ground, said inductor having such value that the combination of inductor and variable condenser has a resonant frequency above the operating frequency of the generator, whereby there results a lower capacity reactance or effectively a higher value of capacity from grids to ground.

5. An oscillation generator comprising a vacuum tube having an anode, a cathode and a grid, an oscillatory circuit including an inductance coil shunted by a condenser coupled between said anode and grid, and the series circuit of a variable condenser and an inductor connected between said grid and cathode, said inductor having such value that the combination of inductor and variable condenser has a resonant frequency above the operating frequency of the generator, whereby there results a lower capacity reactance or effectively a higher value of capacity from grid to cathode, a connection for supplying positive potential to said anode relative to said cathode, a coil in said connection having an impedance which is highest to alternating current of a frequency considerably lower than the frequency of oscillation produced by said generator, and a choke also in said connection and located between said coil and said anode.

6. An oscillation generator comprising a vacuum tube having a grid, an anode and a cathode, a connection from ground to said cathode, an oscillatory circuit including an inductance coil and capacitor coupled between said grid and anode, the capacity between said anode and cathode consisting substantially only of the internal anode-to-cathode tube capacity and the stray capacities to ground of the associated circuit elements, the capacity between said grid and cathode consisting of the internal grid-to-cathode tube capacity plus the capacity of a variable condenser located externally of the vacuum tube and connected between said grid and ground, and an inductor in series with said condenser in the path between said grid and ground, said inductor having such value that the combination of inductor and variable condenser has a resonant frequency above the operating frequency of the generator, whereby there results a lower capacity reactance or effectively a higher value of capacity from grid to ground.

7. An oscillation generator comprising a vacuum tube having an anode, a cathode and a grid, an oscillatory circuit including an inductance coil shunted by a condenser coupled between said anode and grid, and the series circuit of a variable condenser and an inductor connected between said grid and cathode, said inductor having such value that the combination of inductor and variable condenser has a resonant frequency above the operating frequency of the generator, whereby there results a lower capacity reactance or effectively a higher value of capacity from grid to cathode, a connection for supplying positive potential to said anode relative to said cathode, the series circuit of a pair of coils in said connection, a bypass condenser connecting the junction point of said pair of coils to said cathode, that coil of said pair nearest said anode being a radio frequency choke, the other coil having an impedance which is greater to alternating current of a frequency considerably lower than the frequency of oscillation than to current of the operating frequency.

8. An oscillation generator comprising a vacuum tube having an anode, a cathode and a grid, an oscillatory circuit including an inductance coil shunted by a condenser coupled between said anode and grid, and the series circuit of a variable condenser and an inductor connected between said grid and cathode, said inductor having such value that the combination of inductor and variable condenser has a resonant frequency above the operating frequency of the generator, whereby there results a lower capacity reactance for effectively a higher value of capacity from grid to cathode, a connection for supplying positive potential to said anode relative to said cathode, the series circuit of a pair of coils in said connection, a bypass condenser connecting the junction point of said pair of coils to said cathode, that coil of said pair nearest said anode being a radio frequency choke, the other coil having an impedance which is high to alternating current in the frequency range of 20 kc. to 50 kc.

DONALD L. CHRISTENSON.

REFERENCES CITED

The following references are of record in the file of this patent:

UNITED STATES PATENTS

| Number | Name | Date |
|---|---|---|
| 1,857,029 | Moser | May 3, 1932 |
| 1,886,337 | Anderson | July 5, 1932 |
| 1,882,075 | Gebbard | Oct. 11, 1932 |
| 1,896,781 | Llewellyn | Feb. 7, 1933 |
| 1,943,627 | Rothe et al. | Jan. 16, 1934 |
| 1,976,570 | Llewellyn | Oct. 9, 1934 |
| 1,982,916 | Kummerer | Dec. 4, 1934 |
| 2,012,497 | Clapp | Aug. 27, 1935 |
| 2,127,334 | Hathaway | Aug. 16, 1938 |

FOREIGN PATENTS

| Number | Country | Date |
|---|---|---|
| 492,624 | Great Britain | Sept. 23, 1938 |

OTHER REFERENCES

Ultra-High-Frequency Radio Engineering by Emery, copyright 1942 and 1944.

Hyper and Ultra-High Frequency Engineering, Sarbacher and Edson, John Wiley & Sons, Inc., 1943.

Radar Electronics Fundamentals, U. S. Govt. Printing Office.